Figure 1:
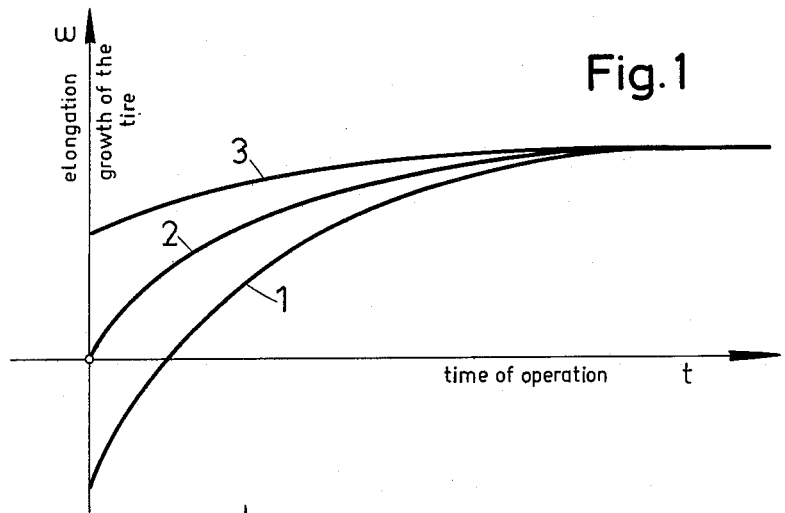

United States Patent Office 3,233,020
Patented Feb. 1, 1966

3,233,020
METHOD OF MAKING PNEUMATIC TIRES WITH STRENGTH MEMBERS OF POLYAMIDE
Hans Meumann, Letter, Hannover, Germany, assignor to Continental Gummi-Werke Aktiengesellschaft, Hannover, Germany
Filed Oct. 21, 1963, Ser. No. 317,745
Claims priority, application Germany, Oct. 24, 1962, C 28,254
4 Claims. (Cl. 264—100)

The present invention relates to a method of making pneumatic tires with strength members or reinforcements made on the basis of polyamides, polyesters and polyolefines or other synthetic material suitable for the manufacture of strength members for tires. More specifically, the present invention relates to the above outlined method according to which the tire following its vulcanization is, after its removal from the vulcanization mold, filled with a pressure medium and, in this condition, subjected to the effect of the pressure medium until the tire has cooled to a temperature at which for all practical purposes it does not undergo any further shrinking.

With tires equipped with strength members of the above mentioned type, it may occur that the strength members arranged within the range of the bottom ellipse become de-tensioned, whereas in the remaining sections of the tire, i.e. those sections which do not have any contact with the road, the strength members remain under the tension corresponding to the tire inner pressure. If such a tire due to driving condition becomes hot—in which instance temperatures of more than 90° C. may occur—the tire will, when the vehicle is at a standstill, cool to such an extent that a flattening will occur within the range of the bottom ellipse. This flattened portion will when the vehicle again starts moving only very slowly arch out at the respective flattened portions, which fact produces a bumpy movement. This phenomenon, which is frequently termed "flat spotting," is well known.

In connection with the production of tires having strength members of polyamide and other synthetic material, it is also known to remove the tire in not yet cooled condition from the vulcanization mold and to mount the tire immediately on a rim-like device where it is subjected to an inner pressure holding the tire after its vulcanization at a size which practically corresponds to the dimensions of the vulcanizing mold. In this condition, the tire is cooled to a temperature at which the mentioned strength members will no longer undergo any material shrinking. This method, however, does not prevent or make ineffective the above mentioned flat spotting.

It is, therefore, an object of the present invention to provide a method of making pneumatic tires with strength members of polyamide and the like, which will overcome the above mentioned drawbacks.

It is another object of this invention to provide a method of the above mentioned type which will prevent or at least considerably reduce the phenomenon of the flattening of the tire surface.

It is a further object of the present invention to provide a method of the above mentioned type which will prevent the relative high initial expansion of the synthetic strength members.

Still another object of this invention consists in the provision of a method as set forth above which will prevent or at least considerably reduce any tension between the strength members and the surrounding rubber material as there might otherwise be caused by the thermal treatment involved in the method.

It is still another object of this invention to provide a method of producing pneumatic tires with strength members of polyamide and other synthetic material, which will greatly reduce the danger of the formation of tears in the tire.

Figure 2:
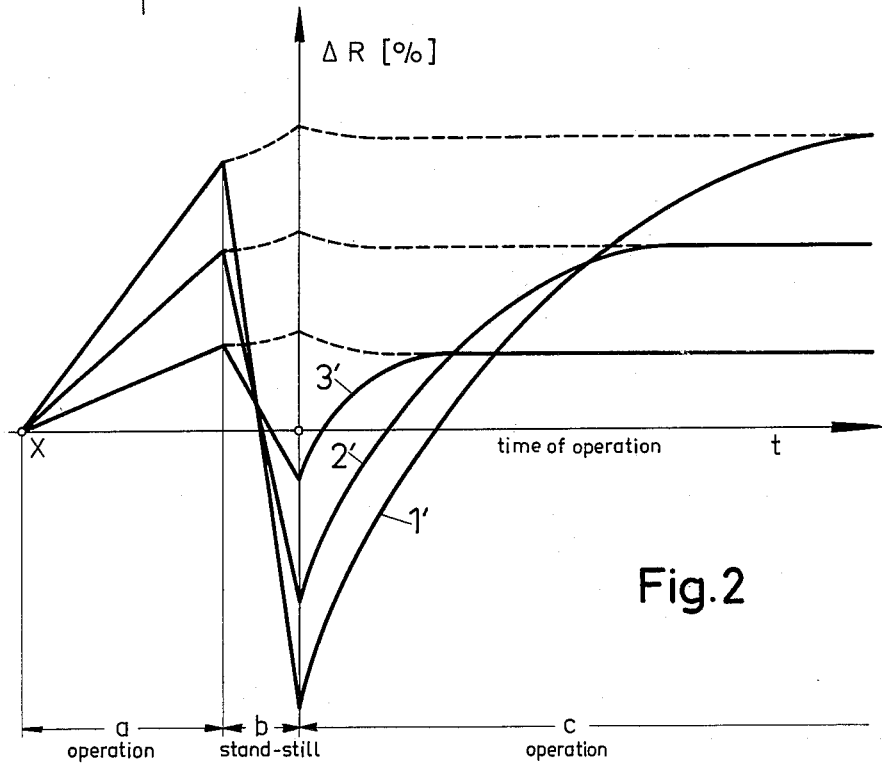

These and other objects and advantages of the invention will appear more clearly from the following specification in connection with the accompanying drawings, in which:

FIGS. 1 and 2 by way of graphs illustrate the advantageous properties of a method according to the present invention.

Figure 3:
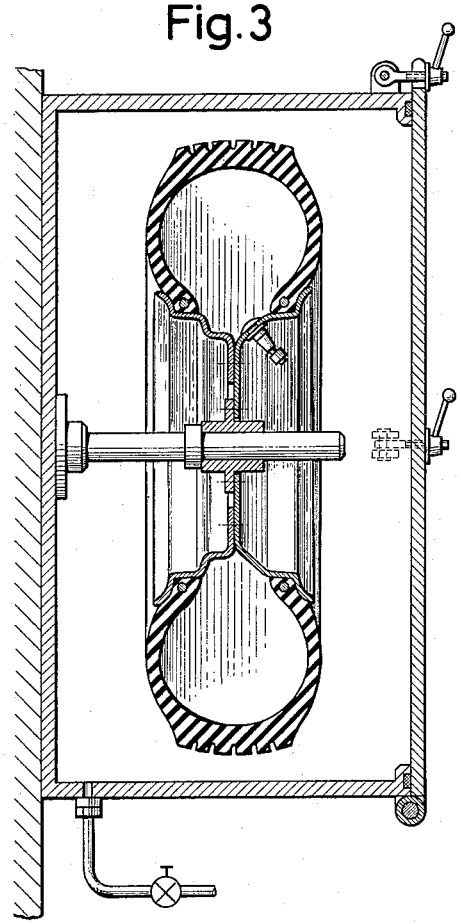

FIG. 3 is a vertical section through a device for carrying out the method according to the present invention.

The method according to the present invention is characterized primarily in that the tire following its vulcanization, while under the influence of a pressure medium is subjected at least for a number of minutes to a temperature which is in excess of the temperature that may be encountered when the tire is in operation while said temperature must, of course, be less than the temperature at which the strength member of polyamide, polyester or the like synthetic materials having heat shrinkage characteristics similar to those of polyamide and polyester would be destroyed. During this heat treatment the tire is preferably mounted on an auxiliary rim.

Advantageously, during this heat treatment, temperatures are selected which exceed the expected maximum temperature of operation by about from 20 to 30° C. This means that temperature treatments at from 90 to 130° C. may be employed. This heat treatment may extend preferably for a period of from 10 to 40 minutes although under certain circumstances it will be possible to select a treatment time of from one to several hours depending on the size of the tire.

Referring now to the drawing in detail and FIG. 1 thereof in particular, FIG. 1 illustrates three graphs of which graph 1 illustrates the behavior of a tire which has not been treated after its vulcanization. Graph 2 illustrates the behavior of a pneumatic tire which, following its vulcanization, has been inflated in warm condition and after being inflated has been cooled up to room temperature. Graph 3 illustrates the behavior of a tire which has been treated in conformity with the present invention.

While with a tire as represented by graph 1 a shrinking occurs, it will be seen from the drawing that a shrinking of the tire represented by graph 2 has been avoided. However, the expansion of the tire which in practical operation makes itself felt as an expansion of the circumference or an increase in the size of the tire, is still unfavorable over the behavior of the tire represented by graph 3 corresponding to a tire treated according to the present invention. As will be seen from FIG. 1, the expansion of the tire according to the present invention has been considerably reduced while nevertheless the shrinking of the tire has been totally eliminated.

The diagram of FIG. 2 shows three pairs of graphs namely the pairs 1', 2' and 3' which illustrate the behavior of tires as referred to in connection with the discussion of FIG. 1. The diagram of FIG. 2 shows the behavior of pneumatic vehicle tires. All three tires start from a certain tire size which in unused condition of the tire (point $x$ of the diagram) has been designated 100%. In addition thereto, the diagram shows how the tire radius (the outer tire diameter) changes with the time of operation. There are illustrated three test periods namely, the test period $a$, the test period $b$, and the test period $c$.

During the test period $a$, the tire is put into operation and during this test period undergoes warming up. Subsequently, the tire, or the vehicle equipped with the tire, is stopped. This standstill period of the tire is represented by the test section $b$. During this standstill period, the tire undergoes a cooling-off process. It is to be noted that during these tests, all three test tires are under the same axial load. During the test section c, the tires are again in operation and warm up.

As will be evident from FIG. 2, during the test period a, the warming up of the tire results in a certain increase in the size of the tire. The increase in the size of a tire treated according to the present invention is, however, considerably less than the increase in the tire size of the tires 2' and 1'. Moreover, with the tire represented by graph 3', a considerably less flattening will be observed which as also shown in the diagram is overcome during the test period c in a considerably shorter time.

In this connection, attention may also be directed to the fact that the dash portion of the graphs 1', 2' and 3' indicate the behavior of those tread sections of the tire which do not engage the ground. During the test period b, these sections show an increase even though a slight one and, subsequently, during test period c show a slight shrinking. This effect becomes greater with the increase in the number of layers of the mentioned strength members combined in the carcass. With a tire having a comparatively large number of inserts, for instance with giant tires, a better effect can be obtained than with tires having only a two-layer carcass.

The method according to the invention is in particular suitable also for such tires of the above mentioned type which cannot be subjected to an inner pressure immediately following the vulcanization, as is the case for instance with tires which are subjected to the heating by an autoclave. The tires may after their vulcanization be cooled and only then be mounted on an auxiliary rim and subsequently be inflated. The cooled-off tire subjected to an inner pressure is then treated for instance in a heat box as shown in FIG. 3, and, more specifically, at a temperature of approximately 30° C. above the temperature to be expected when the tire is in practical operation. It may be added that the inflating pressure should preferably correspond to the prescribed tire pressure or be in excess thereof. The said treatment is continued until the temperature at the inner surface of the tire (i.e. the inner surface of the hollow chamber under the effect of a pressure medium) is lower by 10° C. than the temperature of the atmosphere surrounding the tire, i.e. of the temperature of the heating medium acting upon the outside of the tire. Generally, the treatment period corresponds to the vulcanization period. Also in this instance the desired favorable thermofixing of the synthetic strength members will be obtained and flat spotting will be prevented.

For purposes of expediting the method according to the present invention, it is also possible if desired to fill the hollow chamber of the tire with a pre-heated pressure medium so that when a tire is treated, for instance in a heating chamber, heat can act upon the tire body from the outside as well as from the inside.

As will be evident from the above, the treatment according to the invention not only eliminates the above mentioned flat spotting but also eliminates the relatively high initial expansion of the strength members in turn prevents an undue increase in the tire size. It is also evident from the above that the thermal treatment prevents tensions between the rubber and the strength members or at least greatly reduces the same. This in turn results in a better adherence between the rubber and the strength members and consequently greatly reduces the possibilities of tear formations in view of the elimination of tensions in the rubber.

It may furthermore be mentioned that the thermal post-treatment in conformity with the present invention brings about a post-vulcanization effect. It is, therefore, possible to reduce the vulcanizing period proper in the vulcanization molds.

It is, of course, to be understood that the present invention is, by no means, limited to the particular method described but also comprises any modifications within the scope of the appended claims.

What I claim as:

1. A method of post-treating a completely vulcanized pneumatic tire having strength members therein shrinking under the influence of heat, especially strength members of polyamide and polyester, which includes the steps of: after the tire to be treated has been completely vulcanized and removed from its vulcanizing mold filling the tire with a pressure medium, and heating the tire in this condition to a temperature within the range of from 80 to 130° C. while maintaining the thus heated tire at the respective temperature within said range over a period of from three minutes to three hours, depending on the tire size and tire type and treating temperature.

2. A method of post-treating a completely vulcanized pneumatic tire having strength members therein shrinking under the influence of heat, especially strength members of polyamide and polyester, which includes the steps of: after the tire to be treated has been completely vulcanized and removed from its vulcanizing mold cooling said tire to a temperature at which said strength members do for all practical purposes shrink no longer, subjecting the interior of the tire to be treated to pressure, and heating the tire in this condition to a temperature within the range of from 80 to 130° C. while maintaining the thus heated tire at the respective temperature within said temperature range over a period of from three minutes to three hours, depending on the tire size and tire type and treating temperature.

3. A method of post-treating a completley vulcanized pneumatic tire having strength members therein shrinking under the influence of heat, especially strentgh members of polyamide and polyester, which includes the steps of: after the tire to be treated has been completely vulcanized and removed from its vulcanizing mold filling the tire with a pressure medium, and heating the tire in this condition to a temperature within the range of from 80 to 130° C. while maintaining the thus heated tire at the respective temperature until the temperature on the inner surface of the tire is approximately 10° C. lower than the temperature on the outer surface of the tire.

4. A method of post-treating a completley vulcanized pneumatic tire having strength members therein shrinking under the influence of heat, especially strength members of polyamides and polyesters, which includes the steps off: after the tire to be treated has been completely vulcanized and removed from its vulcanizing mold filling the interior of the tire to be treated with a preheated pressure medium, and heating the tire in this condition from the outside to a temperature within the range of from 80 to 130° C. while maintaining the thus heated tire at the respective temperature within said temperature range over a period of from three minutes to three hours, depending on the tire size and tire type and treating temperature.

References Cited by the Examiner
UNITED STATES PATENTS 3,039,839  6/1962  Waters _____ 264—100
3,040,383  6/1962  Nassimbene _____ 264—231 X ROBERT F. WHITE, *Primary Examiner.*

R. B. MOFFITT, *Assistant Examiner.*